Aug. 9, 1960

F. O. E. SCHULTZ 2,948,558

SLACK ADJUSTER

Filed Aug. 9, 1957

INVENTOR.
FORREST O. E. SCHULTZ
BY
ATTORNEY.

United States Patent Office 2,948,558
Patented Aug. 9, 1960

2,948,558

SLACK ADJUSTER

Forrest O. E. Schultz, Detroit, Mich., assignor to Midland-Ross Corporation, a corporation of Ohio Filed Aug. 9, 1957, Ser. No. 677,401

3 Claims. (Cl. 287—53)

This invention relates to mechanisms by which two members are relatively adjustable for the purposes of compensating for wear or for taking up play, and more particularly with a slack adjusting mechanism for use with brake operating means.

Various types of slack adjusters have been provided but all are relatively complex and costly. It is, therefore, the general object of this invention to provide a light weight, sturdy and yet inexpensive slack adjuster which because of its low cost may be discarded and replaced with a new adjuster when the original becomes excessively worn.

Mechanics and truck drivers have become accustomed to adjusting slack adjusters by listening to the "clicks" caused when the various cams, pawls, ratchet gears and detents are moved and they frequently refer to the required adjustment as a one, two, or more "click" adjustment. In view of this, it is another object of the invention to provide a slack adjuster which affords an audible sound as the relatively movable parts are adjusted to new positions of operaton.

A further object of the invention is to provide a slack adjuster utilizing a minimum number of parts.

More specifically, an object of the invention is to provide a slack adjuster in which a pair of relatively adjustable parts are either biased into engagement with each other for adjustment or locked in engagement with each other for actuating a brake.

The foregoing and other objects and advantages are attained by the present invention, various novel features of which will be apparent from the following description and from the accompanying drawings disclosing a preferred embodiment of the invention.

Referring to the drawings.

Figure 1:
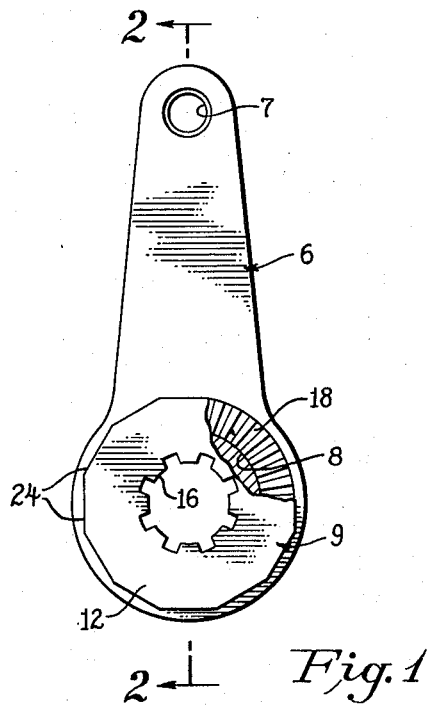
Fig. 1 is a view of a slack adjuster embodying the invention, shown partially in section and taken from one end of a shaft on which the adjuster is to be mounted.

The standard equipment of vehicle wheel brakes includes brake drums, brake shoes, shoe spreaders and other mechanism, the operation of which is well known and need not be particularly illustrated. Such mechanism ordinarily includes a cam shaft which must be rotated to spread the shoes during application of the brakes and the present device is adapted to be mounted on such a shaft.

Referring to the drawings, the present slack adjuster comprises a lever 6 having its upper end provided with an opening 7 for receiving a connecting pin of a brake operating motor and linkage (not shown). The lower end of the arm presents an enlarged opening 8 for rotatably receiving a hub 9. The hub includes a cylindrical part 11 having a flange 12 formed at one end and threads 13 formed at the other end for receiving a nut 14. Both the flange 12 and the nut 14 are larger than the opening 8 and act to limit axial movement of the hub 9 in opposite directions relative to the arm 6 and to hold the parts in assembled condition. The hub is also provided with a plurality of internal splines 16 adapted to match with external splines (not shown) on a brake operating shaft indicated in outline at 15 in Fig. 2.

A radial surface of the flange 12 facing the arm 6 presents a plurality of equally spaced, radially extending serrations or teeth 17. Complementary teeth 18 are formed circumferentially of the opening 8 in the arm 6 to face the teeth 17 on the flange.

Figure 2:
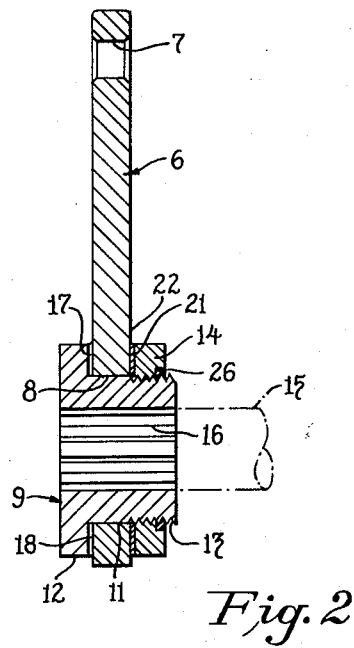
Fig. 2 is a section view of the slack adjuster taken on line 2—2 in Fig. 1.
Figure 4:
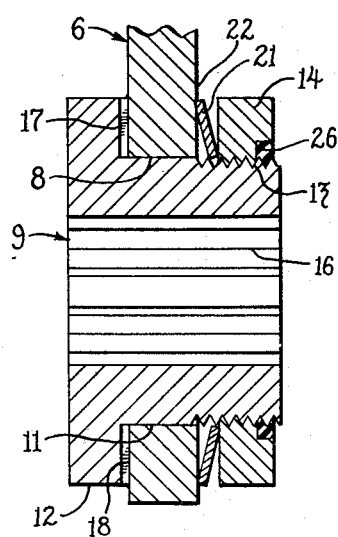
Fig. 4 is an enlarged section view of a portion of the structure shown in Fig. 2 but in a different position of adjustment.

A frusto-conical or bowed washer 21 is fitted over cylindrical part 11 of the hub and is disposed between the nut 14 and a side surface 22 of the arm. The washer is made of resilient material permitting it to be deformed or flattened between the nut 14 and the arm 6 as shown in Fig. 2 and permitting it to resume its normal dish-like position when the nut is released as shown in Fig. 4. In other words, the washer acts as a spring capable of exerting a relatively large force tending to bias the nut away from the arm 6.

The flange 12 is provided with a plurality of flat portions 24 which are adapted to be engaged by a wrench. The nut may be provided with an equal number of flat portion to receive a wrench of the same size. The nut is also provided with an elastic ring 26 which coacts with the threads 13 to lock the nut in any selected position axially of the hub. This type of lock means is well known in the fastener art but it is to be understood that equivalent means for locking the nut in position could be used.

The relative position of the parts during normal operation of the slack adjuster are best seen in Fig. 2 in which the nut 14 has been moved toward flange 12 to compress or flatten the washer 21 and maintain the teeth 17 and 18 in engagement with each other. In this condition the arm and hub rotate as a unit about the axis of the hub 9 and a force applied to the upper end of the arm is effective to rotate the brake operating shaft 15.

Figure 3:
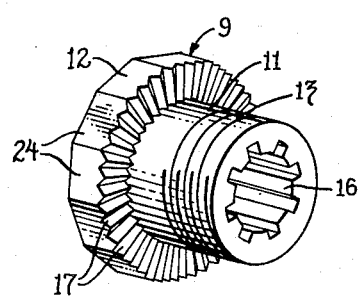
Fig. 3 is a perspective view of the hub of the slack adjuster looking obliquely to the left at Fig. 2.

In order to decrease the stroke of the arm 6 required to apply the brakes or to compensate for wear of the linings on the brake shoes, it is desirable to rotate the cam shaft 15 and consequently the hub 9 to a new position relative to the arm. Referring to Fig. 2, this is accomplished by placing a wrench on the nut 14 and turning it relative to the hub so that it moves away from the arm 6. As this occurs the dished washer 21 expands so that it reacts between the nut 14 and the arm 6 to maintain the teeth 17 and 18 in engagement with each other. After the nut 14 has been turned one or more revolutions it will move axially of the hub 9 and assume a position spaced from the arm a distance slightly greater than the depth of the teeth 17 or 18 and the spring 21 will remain effective to bias the hub 9 axially to the right as seen in Fig. 3. The operator may then remove the wrench from the nut 14 and place it on the flange 12. By applying a force to the wrench, the cam shaft 15 may be rotated relative to the arm 6. During such rotation the arm will be held stationarily in position and the rotating hub 9 will move axially relative to the arm 6 against the bias of the spring 21 so that the teeth 17 on the flange disengage from the teeth 18 on the arm and reengage with the next adjacent teeth. The spring acts to pull the teeth into engagement with each other as soon as the points of the teeth pass over each other and this causes a "click" audible to the operator. Furthermore, the force required to turn the hub increases as the teeth cam up on each other and move the hub 9 axially to deflect the spring 21 and decreases as the points of the teeth pass over each other and permit the spring to bias the hub to its original position. Consequently, the operator may accurately sense each increment of adjustment through the wrench.

It should be noted that during turning movement of the hub, the nut is fixed on the hub through means of the resilient or elastic stop element 26. After the desired adjustment is attained a wrench may be placed on the nut 14 so that the latter is turned relative to the hub 9 for deflecting the washer against the side of the arm. The teeth are then maintained in engagement with each other and the hub and arm turn as a unit.

It will be be seen that there has been provided a slack adjusting mechanism which is extremely simple and compact, and yet one which affords accurate and efficient adjustment which may be gauged by either sound or sensed through changes in forces required to make the adjustment.

It is not intended to limit the invention to the particular forms and details described, and the invention includes such other forms and modifications as may be embraced by the scope of the claims.

It is claimed and desired to secure by Letters Patent:

1. In an operating mechanism for a brake operating shaft, a first member presenting an aperture, a second member supported in said aperture for rotation and axial movement and adapted for connection to said shaft, said second member presenting a radially extending toothed portion facing one side of said first member, said one side of said first member presenting a complementary toothed portion, a lock element adjustable axially on said second member at the other side of said first member, resilient means interposed between said lock element and said first member for biasing said toothed portions into releasable engagement with each other during rotation of one of said members in both directions relative to the other of said members, said lock element maintaining said second member and resilient means attached to said first member for attachment to a brake operating shaft and being adjustable toward said first member to maintain said toothed portions in fixed engagement with each other for movement of said first and second members as a unit.

2. In a slack adjuster arm for operating a brake shaft, an arm presenting an opening in one end, a cylindrical hub adapted to be connected to said shaft for rotation therewith and being supported in said opening for rotation and axial movement, said hub presenting a flanged portion at one side of said arm for limiting axial movement of said hub in one direction, a nut connected to said hub at the other side of said arm for limiting axial movement in the other direction, opposed surfaces of said flanged portion and said arm presenting complementary teeth extending radially from said hub and said opening, respectively, and engageable with each other upon movement of said hub in said one direction, a dished resilient washer disposed between said nut and said arm for biasing said hub in said one direction for releasably resisting swinging movement of said arm in opposite directions relative to said hub, said nut being operable for maintaining said arm, hub, and washer connected together for attachment to a brake operating shaft and being adjustable toward said flanged portion to flatten said resilient washer between said arm and said nut and maintain said teeth in fixed engagement with each other for rotation of said arm and said hub as a unit.

3. In a brake actuating mechanism, the combination of a hub adapted to receive a brake actuating shaft, a lever supported on said hub for rotation and axial movement relative thereto, a flange formed integrally at one end of said hub to limit axial movement in one direction, a nut threaded into engagement with the opposite end of said hub and limiting axial movement of said lever in the other direction, radially extending teeth formed on adjacent surfaces of said hub and lever and being engagable with each other upon axial movement of said lever in said one direction, and a resilient element interposed between said nut and lever and biasing said lever in said one direction, said nut being operative to maintain said lever, hub and element connected together for unitary attachment to a brake operating shaft and being movable between positions permitting swinging movement of said lever in opposite directions relative to said hub and a position inactivating said resilient element between said lever and said nut for movement of said lever and hub as a unit, said lever being movable axially in opposition to said resilient element during swinging movement of said lever relative to said hub.

References Cited in the file of this patent

UNITED STATES PATENTS

| | | |
|---|---|---|
| 834,110 | Devenny | Oct. 23, 1906 |
| 907,053 | Huddle | Dec. 15, 1908 |
| 1,449,273 | Erhart et al. | Mar. 20, 1923 |
| 1,798,936 | Frehse | Mar. 31, 1931 |
| 1,834,530 | Lyman | Dec. 1, 1931 |
| 1,860,770 | Bugatti | May 31, 1932 |
| 2,068,120 | Wirth | Jan. 19, 1937 |
| 2,385,622 | Freeman et al. | Sept. 25, 1945 |
| 2,631,472 | MacDougall | Mar. 17, 1953 |

FOREIGN PATENTS

| | | |
|---|---|---|
| 128,701 | Great Britain | June 27, 1919 |
| 209,161 | Great Britain | Jan. 3, 1924 |